UNITED STATES PATENT OFFICE.

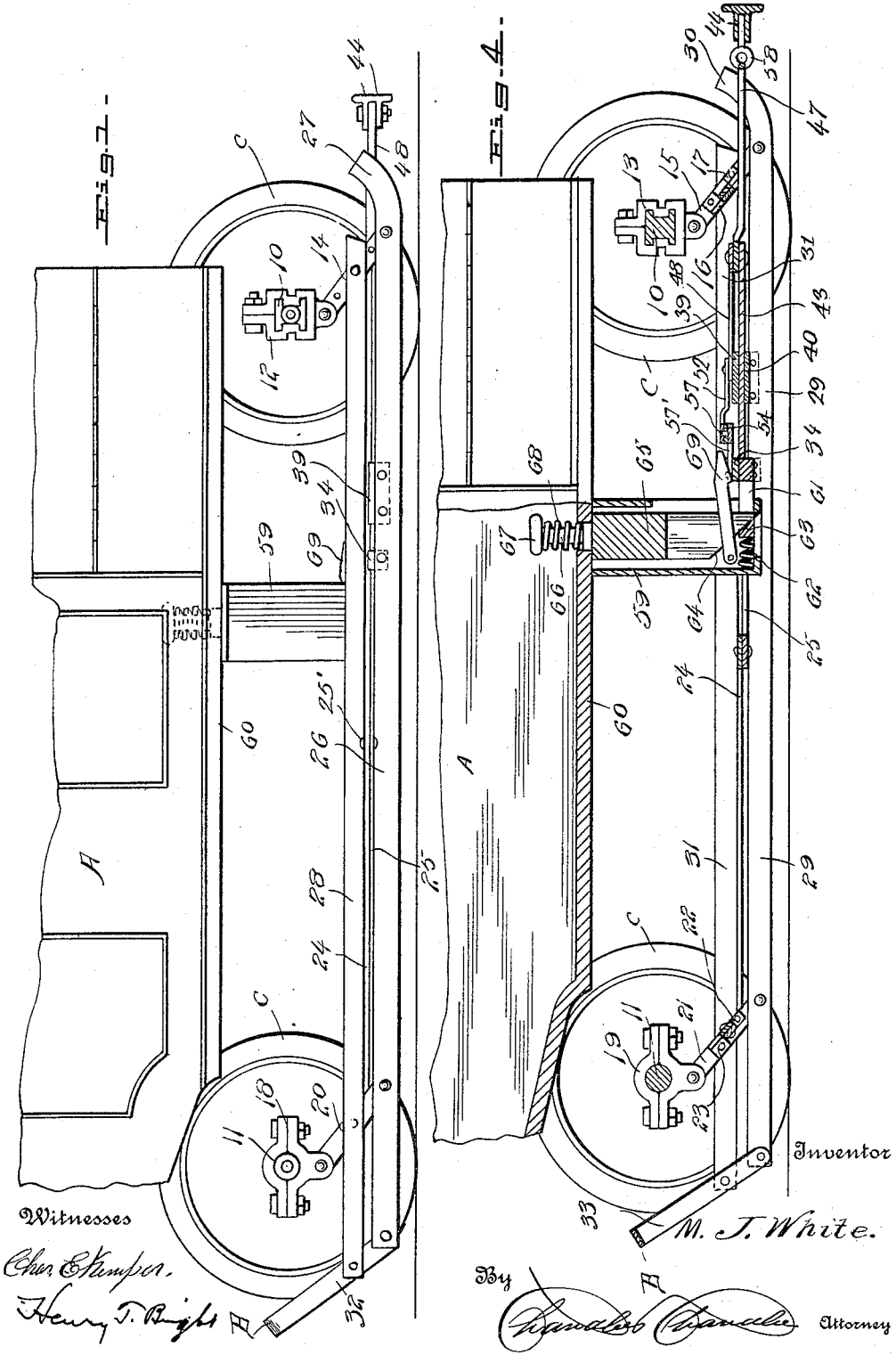

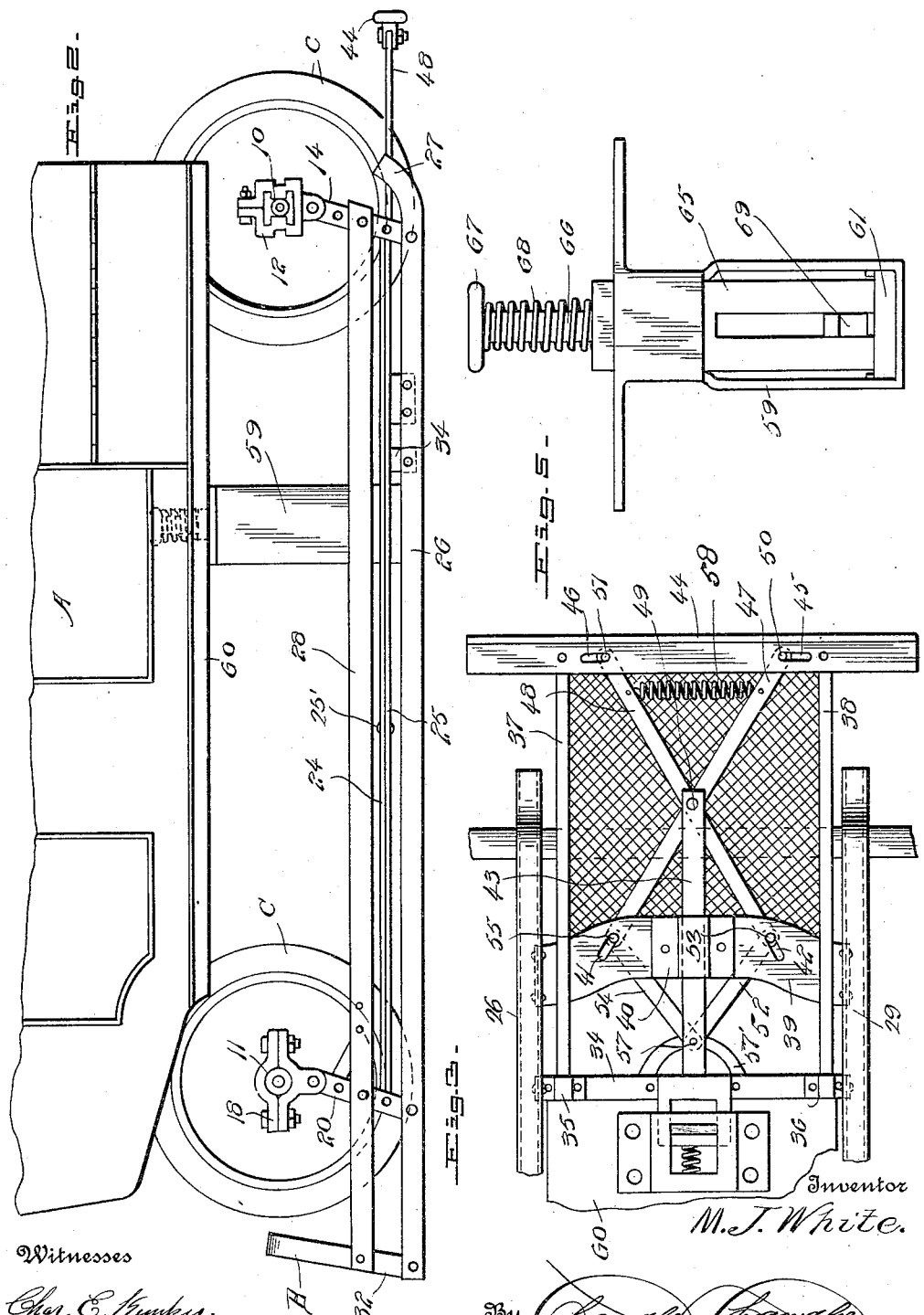

MICHAEL J. WHITE, OF WILMINGTON, DELAWARE.

SAFETY DEVICE FOR AUTOMOBILES.

1,146,828. Specification of Letters Patent. Patented July 20, 1915.

Application filed July 15, 1913. Serial No. 779,200.

*To all whom it may concern:*

Be it known that I, MICHAEL J. WHITE, a citizen of the United States, residing at Wilmington, in the county of New Castle, State of Delaware, have invented certain new and useful Improvements in Safety Devices for Automobiles; and I do hereby declare the following to be a full, clear, and exact description of the invention, such as will enable others skilled in the art to which it appertains to make and use the same.

This invention relates to safety devices for automobiles.

The object of the invention resides in the provision of a safety device for automobiles which includes a fender and a lifting jack, the latter being normally held in inactive position and operated to active position when the fender strikes an object so as to immediately elevate the wheels of the automobile from the ground and check the momentum of the automobile, the fender being carried by the jack and serving to receive and support the objects struck.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of an automobile showing the improved fender and jack applied and in inactive position the near wheels of the automobile being removed; Fig. 2, a view similar to Fig. 1 with the fender and jack in active position the near wheels being removed; Fig. 3, a bottom plan view of the forward portion of what is shown in Fig. 1; Fig. 4, a partial longitudinal section of what is shown in Fig. 1, and Fig. 5, a front view of the tripping device.

Referring to the drawings A indicates generally an automobile which includes front and rear axles 10 and 11 respectively. Mounted upon the front axle 10 are spaced brackets 12 and 13. Pivotally supported by the bracket 12 is a depending arm 14 while a corresponding arm 15 is pivotally supported by the bracket 13. The arms 14 and 15 are connected by crossed braces 16 and 17 whereby said arms are materially strengthened for the performance of the function they are intended to serve. Mounted upon the rear axle 11 are spaced brackets 18 and 19. Pivotally supported by the bracket 18 is a depending arm 20 while a corresponding arm 21 is pivotally supported by the bracket 19. These arms 20 and 21 are connected by crossed braces 22 and 23 for the purpose of strengthening same. The arms 14 and 21 are also diagonally connected by a brace 24, while a brace 25 connects the arms 15 and 20, and these braces are suitably connected where they cross and such connection being indicated at 25'. The free ends of the arms 14 and 20 are connected by an angle-iron beam 26 of U-shaped cross section, the end of said beam adjacent the arm 14 being curved upwardly as at 27, while the other end of said beam is extended a considerable distance beyond the arm 20. The arms 14 and 20 are also connected by a beam 28, disposed parallel to the beam 26 and having one end thereof extended beyond the arm 20 the same distance as the beam 26.

The free ends of the arms 15 and 21 are pivotally connected to an angle-iron beam 29 of U-shaped cross section, the forward end of which is curved upwardly as at 30 while the rear end extends a distance beyond the arm 21. The arms 15 and 21 are also pivotally connected to a beam 31 disposed parallel to the beam 29 and in the same horizontal plane as the beam 28. The rear ends of the beams 26 and 28 are pivotally connected to the arm 32 of a U-shaped member B while the rear ends of the beams 29 and 31 are pivotally connected to the arm 33 of said U-shaped member. By this construction it will be apparent that by swinging the upper end of the U-shaped member B rearwardly the beams 26 and 29 will be elevated from the position shown in Fig. 2 to the position shown in Fig. 1, while the opposite movement of the upper end of the U-shaped member B will lower the beams 26 and 29 from the position shown in Fig. 1 to the position shown in Fig. 2 and during this last named movement of the beams 26 and 29 the same will engage the ground and lift the automobile bodily so as to throw the wheels C thereof out of engagement with the ground.

The fender element of the device is shown as comprising a cross bar 34 the ends of which are connected to the beams 26 and 29. Mounted on this cross bar 34 are depending guide members 35 and 36 in which are slidably mounted longitudinal bars 37 and 38 respectively. Also connecting the beams 26 and 29 forwardly of the bar 34 is a plate 39 from which depends a guide member 40 disposed centrally of said plate. The plate 39 is provided with slots 41 and 42 disposed on opposite sides of the guide member 40 respectively and inclined toward each other. Slidably mounted in the guide member 40 is a bar 43 for a purpose that will presently appear. Connecting the forward ends of the bars 37 and 38 is a fender guard beam 44 provided with slots 45 and 46. Disposed between the guard beam 44 and the plate 39 are cross levers 47 and 48 pivotally connected together at their centers by a pivot pin 49 said pin also connecting the forward end of the bar 43 to said levers 47 and 48. The forward end of the lever 47 is provided with a projection 50 movable in the slot 45 while the lever 48 carries a projection 51 movable in the slot 46. The rear end of the lever 47 is connected to the forward end of a lever 54 by means of a pivot pin 55 movable in the slot 41. Likewise the rear end of the lever 48 is connected to the forward end of a lever 52 by means of a pivot pin 53 movable in the slot 42. The rear ends of the levers 52 and 54 are pivotally mounted on a stud 57 carried by a bracket 57′ attached to the cross bar 34. The forward ends of the levers 47 and 48 are connected by a tension spring 58 which tends to hold the projections 50 and 51 at the inner ends of respective slots 45 and 46 and also constantly tends to hold the pivot pins 53 and 55 at the forward ends of respective slots 42 and 41.

The tripping mechanism of the device is shown as comprising a bracket 59 depending from the car floor 60 at the rear of the bar 34. This bracket 59 has slidably mounted in the lower end thereof a latch 61 normally held in projected position by a spring 62 and movable in the same plane as the bar 43. This latch 61 is provided with an opening having a beveled rear wall 63 which coöperates with the beveled lower end 64 of a vertically movable plunger 65. The upper end of this plunger 65 terminates in a stem 66 which is slidably engaged through the car floor 60. The upper end of the stem 66 terminates in a stem 67 whereby the plunger 65 may be conveniently depressed by the foot of the operator, said plunger being normally held elevated by a spring 68 encircling the stem 66 and having one end bearing against the car floor 60 and the other end bearing against the head 67. Pivoted upon the bracket 59 is a sear 69 which is adapted to hold the latch 61 retracted against the influence of the spring 62.

When the parts are in the position shown in Fig. 1 the bar 34 will be supported upon the upper side of the latch 61 and the inner end of the bar 43 will be disposed in engagement with the outer end of the latch 61. With the parts thus disposed it will be apparent that should the guard beam 44 come in contact with an object during the movement of the automobile the bar 43 will be forced rearwardly and the latch 61 moved to retracted position where it will be engaged and held by the sear 69. As soon as the latch 61 has passed from beneath the bar 34 the beams 26 and 29 will swing downwardly and engage the ground and the momentum of the automobile will quickly raise the wheels thereof from the ground so that the movement of the machine will be almost immediately stopped.

What is claimed is:

The combination with a vehicle, of a jack swingingly supported upon the axles of the vehicle and including spaced runners mutually connected by a cross bar, a spring latch carried by the vehicle for engaging the cross bar to support the runners elevated, and a spring controlled plunger carried by the vehicle adapted when moved in one direction to disengage the latch from the cross bar and release the runners for descent under the influence of gravity.

In testimony whereof, I affix my signature, in the presence of two witnesses.

MICHAEL J. WHITE.

Witnesses:
CHARLES C. CLANCY,
CHARLES DORSCHEL.

Copies of this patent may be obtained for five cents each, by addressing the " Commissioner of Patents, Washington, D. C."